(12) United States Patent
Akiyama

(10) Patent No.: US 9,152,017 B2
(45) Date of Patent: Oct. 6, 2015

(54) ROTATIONAL JOINT

(75) Inventor: Kazuhiro Akiyama, Tokyo (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 528 days.

(21) Appl. No.: 13/526,707

(22) Filed: Jun. 19, 2012

(65) Prior Publication Data

US 2012/0328358 A1    Dec. 27, 2012

(30) Foreign Application Priority Data

Jun. 21, 2011    (JP) .................. 2011-137733

(51) Int. Cl.
  *G03B 15/03*    (2006.01)
  *G03B 15/05*    (2006.01)

(52) U.S. Cl.
  CPC ........ *G03B 15/05* (2013.01); *G03B 2215/0507* (2013.01); *Y10T 403/32541* (2015.01)

(58) Field of Classification Search
  CPC ...................................................... G03B 15/03
  USPC ......... 403/111, 113, 116, 117, 120, 150, 154, 403/157; 396/177, 178
  See application file for complete search history.

(56) References Cited

U.S. PATENT DOCUMENTS 3,060,706 A * 10/1962 Hess .......................... 403/120
5,037,231 A *  8/1991 Kitamura .................. 403/120
6,779,234 B1 *  8/2004 Lu et al. ..................... 16/340
6,909,847 B2 *  6/2005 Ujikane et al. ............ 396/178
7,519,288 B2 *  4/2009 Kim ............................ 396/177
2009/0144935 A1 *  6/2009 Peng et al. ................. 16/321
2010/0050383 A1 *  3/2010 Wang et al. ................. 16/297

FOREIGN PATENT DOCUMENTS

| JP | 11-212152 | 8/1999 |
| JP | 2000-310809 A | 11/2000 |
| JP | 2009-086226 A | 4/2009 |
| JP | 2010-175630 | 8/2012 |

OTHER PUBLICATIONS

Japan Office action, dated Feb. 10, 2015 along with an English translation thereof.

* cited by examiner

*Primary Examiner* — Michael P Ferguson
(74) *Attorney, Agent, or Firm* — Greenblum & Bernstein P.L.C.

(57) ABSTRACT

A rotational joint is provided that comprises a first member, second member, rotational shaft member, rotational biasing member and stop ring. The first member has a pair of sidewalls that face each other. The second member has a pair of plate members each disposed proximate to the outer-facing sides of the sidewalls. The rotational shaft member is fitted into shaft holes in each of the plate members and the sidewalls. The rotational biasing member is disposed around the rotational shaft member and its one end is engaged with the first member and the other end with the stop ring fixed to the rotational shaft member. The first member is rotatable with respect to the rotational shaft member that is fixed to the second member. The rotational biasing member and stop ring are disposed between the sidewalls.

19 Claims, 11 Drawing Sheets

ROTATIONAL JOINT

BACKGROUND OF THE INVENTION

1. Field of the Invention

The present invention relates to a rotational joint that is provided with a biasing member and used for connecting two members that are rotatable with respect to one another.

2. Description of the Related Art

Some cameras are configured with a built-in flash that pops out from the camera body when illuminating a scene requires a flash of light. By positioning the flash as far as possible from the photographing optical axis, vignetting and red-eye effect caused by light emitted from the flash device can be prevented. For example, a pop-up mechanism may include a shaft with the flash on its tip. The shaft is slidable in the vertical direction and biased upward by a spring. When retracting the flash, the shaft is retracted inside the camera body and its position is fixed by an engaging mechanism. When shooting with the flash, a user manipulates a slider knob that releases the engagement, thus the spring pushes up the shaft and the flash pops up from the camera body (as disclosed in Kokai 2009-086226). Further, in another example of the built-in flash configuration, a flash body is connected to one end of a support member via a rotational shaft while the other end of the support member is connected to the camera body via a rotational shaft so that the flash body is lifted up from the camera body when flash lighting is required (as disclosed in Kokai 2000-310809).

SUMMARY OF THE INVENTION

As the size of the camera is reduced, the position of the built-in flash on the camera body gets closer to the photographing optical axis, thus the vignetting effect and the red-eye effect increases. In particular, for a compact interchangeable-lens camera, these effects are substantial when a short focal-length lens is used. Therefore, in this type of camera the flash should be moved further from the optical axis. However, as the size of the camera body is reduced, the length of the shaft in the pop-up or the lift-up mechanism is also reduced, thereby the displacement of the flash from the optical axis is insufficient in the prior art.

Therefore, it may be contemplated to configure the pop-up mechanism with a plurality of members and connecting the members together with rotational joints to extend the length of the pop-up mechanism using a mechanical linkage of the members. However, to put such a mechanism into practice, a substantially narrow and miniaturized rotational joint including a biasing member is required. Further, a process for assembling the rotational joint is necessary and must be simple with respect to both cost and production.

Therefore, one aspect of the present invention is to provide a rotational joint that is equipped with a biasing member mounted in a small space and that is easy to assemble.

According to the present invention, a rotational joint is provided that comprises a first member, second member, rotational shaft member, rotational biasing member and stop ring.

The first member has a pair of sidewalls that face each other. The second member has a pair of plate members that are disposed proximate to the outside faces of the sidewalls. The rotational shaft member is fitted into shaft holes provided in each of the plate members and the sidewalls. The rotational biasing member is disposed around the rotational shaft member and one end of the rotational biasing member is engaged with the fist member and the other end engaged with a stop ring that is fixed to the rotational shaft member. The first member is rotatable with respect to the rotational shaft member. The rotational shaft member is fixed to the second member. The rotational biasing member provides a rotational biasing force about the rotational shaft member between the first and second member. The rotational biasing member and the stop ring are disposed between the sidewalls.

From another aspect of the present invention is a rotational joint that comprises the first member, the second member, a rotational shaft member and a rotational biasing member.

The rotational shaft member has a noncylindrical shape and is fitted into shaft holes provided in each of the plate members and the sidewalls. The rotational biasing member is disposed inside the first member and provides a rotational biasing force about the rotational shaft member. The stop ring is engaged with the rotational biasing member and is aligned with the rotational shaft member.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
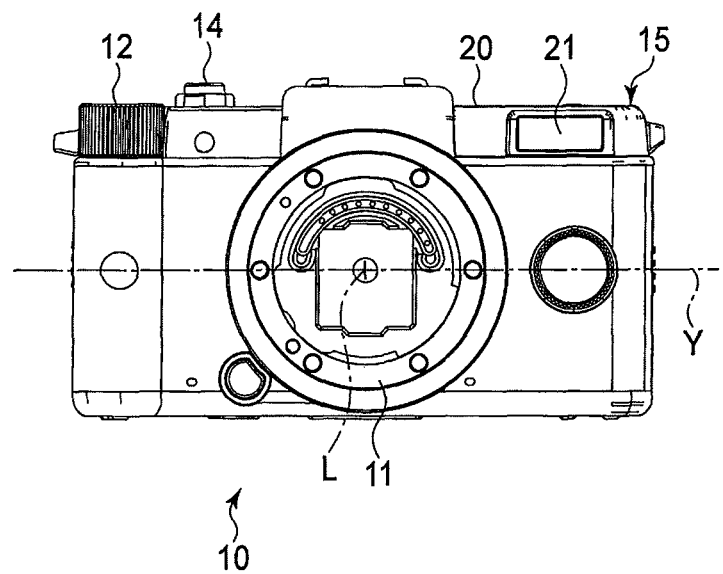
FIG. 1 is a front elevational view of a compact camera when a built-in flash is retracted.
Figure 2:
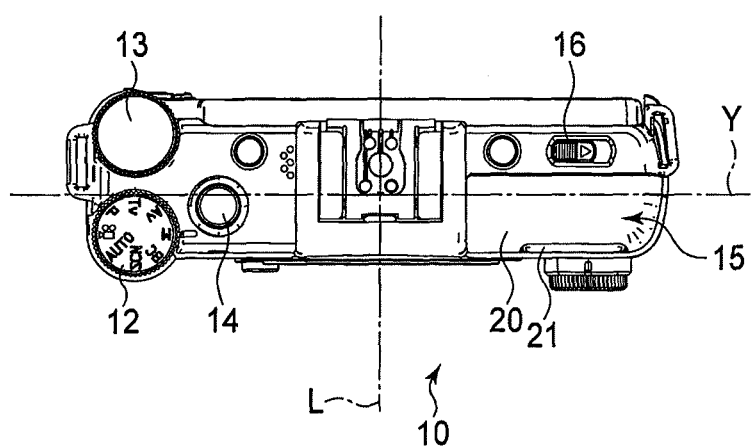
FIG. 2 is a top plan view of the compact camera when the built-in flash is retracted.
Figure 3:
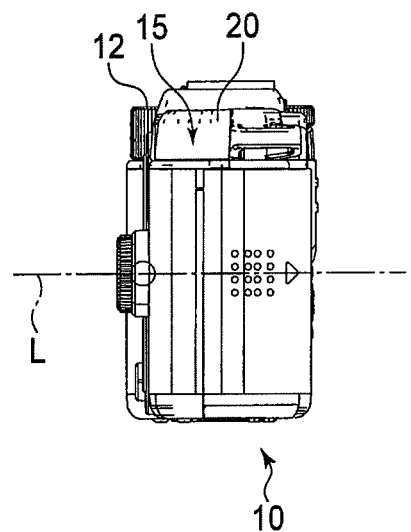
FIG. 3 is a right side elevational view of the compact camera when the built-in flash is retracted.

The present invention is described below with references to the embodiments shown in the drawings.

FIGS. 1-4 are a front elevational view, a top plan view, a right side elevational view and a front perspective view of a compact camera to which a rotational joint of an embodiment of the present invention is applied. The rotational joint of the present embodiment is applied to the pop-up mechanism for a built-in flash. Incidentally, in FIGS. 1-4, the pop-up mechanism is retracted inside the camera body.

The compact camera of this embodiment may be an interchangeable-lens digital camera. A lens mount 11 for connecting a lens barrel may be provided in the center of the front face of the camera body 10. For example, as shown in the front elevational view and the top plan view, a mode dial 12, an E-dial or a shaft encoder 13 and a release button 14 are provided on the left-hand side of the camera body 10, while a built-in flash unit 15 is provided on the front right-hand side. Further, on the top of the camera body 10 and behind the built-in flash unit 15, a pop-up knob 16 for extending the built-in flash unit 15 is provided. Note that in each of the figures, the camera body 10 is depicted with the lens barrel detached from the lens mount 11. However, in FIGS. 1-3, a dashed line indicates the optical axis L of the lens barrel when it is attached to the lens mount 11.

Figure 9:
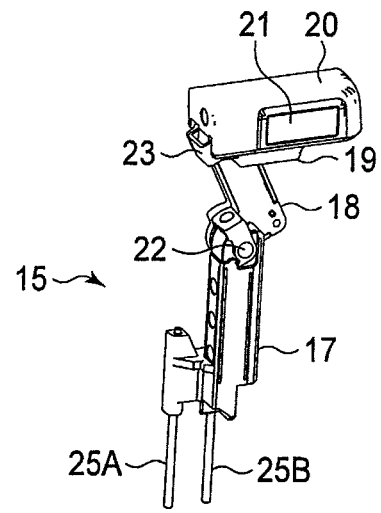
FIG. 9 is a front perspective view of the built-in flash unit in the popped up position.
Figure 10:
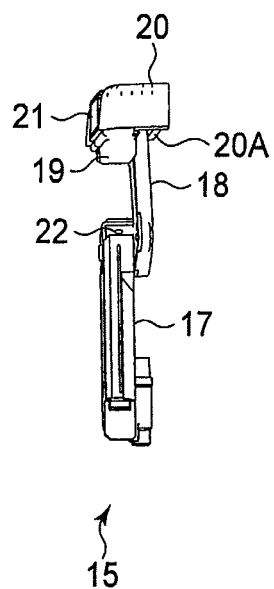
FIG. 10 is a side perspective view of the built-in flash unit in the popped up position.

FIGS. 5-8 are a front elevational view, a top plan view, a right side elevational view and a front perspective view of the camera body 10 when the built-in flash unit 15 is extended in the pop-up position, where FIGS. 5-8 correspond to FIGS. 1-4, respectively. Further, a front perspective view and a side perspective view of the built-in flash unit 15 in the pop-up position are shown in FIG. 9 and FIG. 10.

The pop-up mechanism of the built-in flash unit 15 includes a shaft member 17, an arm member 18 and a flash support member 19. A light source (not shown) of the built-in flash unit 15 is supported by the flash support member 19 and housed inside a flash cover 20. Further, on the front side of the flash cover 20, a window 21 is provided for emitting flashed light.

The shaft member 17 is linearly movable in the vertical direction (a direction of a first axis) in the camera body 10 and biased upward with respect to the camera body 10 by a biasing member, such as a coil spring and the like. The tip of the shaft member 17 is provided with a rotational joint 22 (a second axis) and one end of the arm member 18, which may be formed in a shape of the letter "L", is rotatably connected. Further, the other end of the arm member 18 is provided with a rotational joint 23 (a third axis) that rotatably supports the flash support member 19.

The rotational joint 22 is provided with a rotational biasing member, such as a torsion spring and the like, to bias the arm member 18 to rotate toward the outer side of the camera body 10 with respect to the shaft member 17. A rotational biasing member, such as a torsion spring and the like, is also provided on the rotational joint 23 so that the flash support member 19 is rotationally biased in the direction opposite to the biasing direction of the rotational joint 22. Namely, in FIG. 5, the rotational joint 22 applies a biasing force to the arm member 18 in the clockwise direction and the rotational joint 23 applies a biasing force to the flash support member 19 in the counter-clockwise direction.

The rotational joints 22 and 23 are each provided with a stop mechanism to limit rotation to predetermined ranges so that the rotations of the arm member 18 with respect to the shaft member 17 and the flash support member 17 with respect to the arm member 18, namely those induced by each of the rotational biasing members, are limited to a predetermined angular range. Further, the translation of the shaft member 17 by the biasing member is also limited to a predetermined height by a stop mechanism. Incidentally, in FIGS. 5-10, the translation and rotational motions of all of the members are suspended by their respective stop mechanisms, such that the final state of the pop-up transformation is as illustrated.

Figure 4:
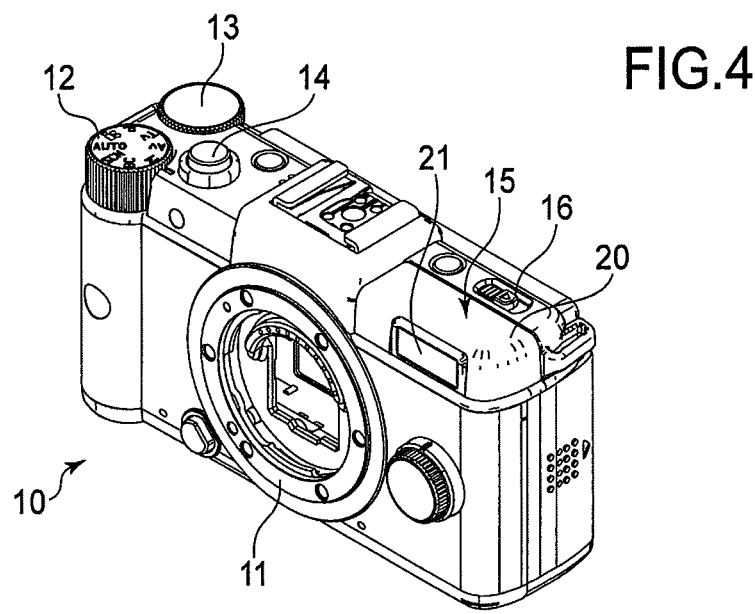
FIG. 4 is a front perspective view of the compact camera when the built-in flash is retracted.
Figure 8:
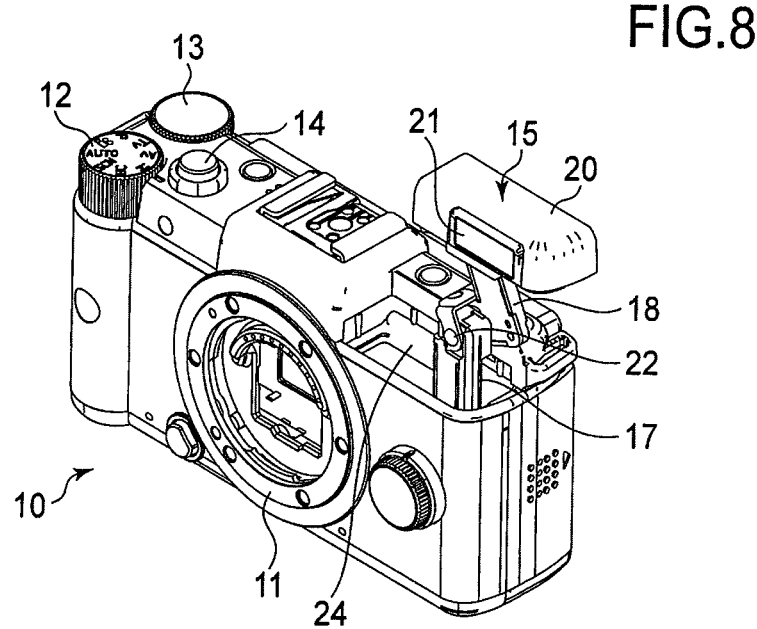
FIG. 8 is a front perspective view of the compact camera when the built-in flash is popped up.

As illustrated in FIG. 8, a recessed flash seat 24, which is a recessed portion corresponding to the flash cover's 20 shape, is formed at a corner determined by the top, front and left side faces of the camera body 10 (the right-hand side in FIG. 8). Namely, when the flash is retracted, the flash cover 20 is received and fitted in the recessed flash seat 24, as shown in FIG. 4, so that the entire body generally forms a rectangular cuboid.

The recessed flash seat 24 is provided with a shaft void where the shaft member 17 is inserted and retracted along the vertical ridgeline defining the front face and the left-side face (on the right-hand side in FIG. 8). Inside the shaft void, a rod-like guide member 25 may be disposed in the vertical direction and the shaft member 17 is slidably engaged with the guide member 25A, as illustrated in FIG. 9.

A spring guide rod 25B that is arranged parallel to the guide member 25A is provided on the shaft member 17. A coil spring (not shown) is disposed about the spring guide rod 25B. Namely, when the shaft member 17 is retracted, the coil spring is compressed and the shaft member 17 is biased upward from the camera body 10 along the guide member 25A. When the shaft member 17 is depressed and the flash cover 20 is seated on the recessed flash seat 24, the position of the flash support member 19 is fixed by a locking mechanism that is disposed between the pop-up knob 16 and the flash cover 20, and thereby the pop-up mechanism is maintained in the retracted position.

Incidentally, the arm member 18 is positioned on the rear side of the flash support member 19 and the shaft member 17, and when the flash is retracted, the arm member 18 is laid side-by-side behind the flash support member 19 and housed inside an arm receiving void 20A provided within the flash cover 20.

By sliding or manipulating the pop-up knob 16, the engagement of the locking mechanism with the flash support member 19, which is maintained in the retracted position shown in FIGS. 1-4, is released. Accordingly, the shaft member 17 is pushed up in direction "A" of FIG. 5, the arm member 18 is rotated in direction "B" with respect to the shaft member 17 and the flash support member 19 is rotated in direction "C" with respect to the arm member 18 by the respective biasing forces applied by each of the biasing members.

Figure 11:
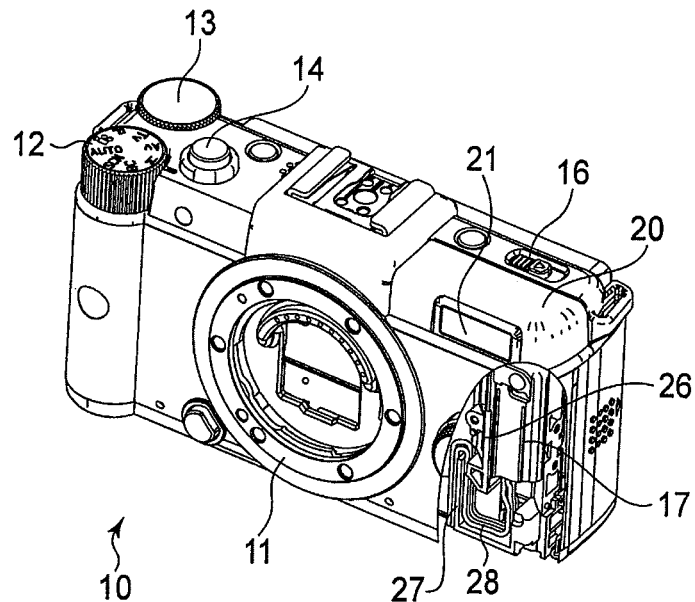
FIG. 11 is a partially cutaway perspective view of the camera body in the retracted position.
Figure 12:
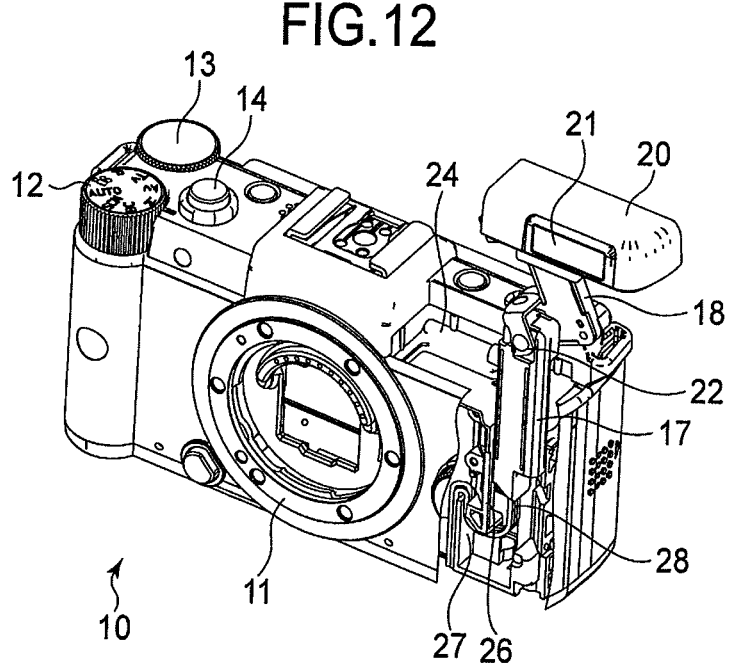
FIG. 12 is a partially cutaway perspective view of the camera body in the popped up position.

Note that FIG. 11 and FIG. 12 are perspective views of the camera body 10 with a part of its housing cut away to illustrate the inside of the shaft void where the shaft member 17 is inserted. FIG. 11 illustrates a situation when the flash is retracted (in the retracted position) and FIG. 12 illustrates a situation when the flash is extended (in the popped up position or popped out position).

The shaft void is separated from the central part of the camera body 10 by partitions 26 and 27. The partition 26 extends downward from the recessed flash seat 24 along a flank of the shaft member 17 and its bottom end reaches to a position slightly apart from the bottom of the housing. On the other hand, the partition 27 is provided at a position closer to the central part of the camera body 10. The partition 27 extends upward from the bottom and parallel to the partition 26 to where its top end reaches a position slightly higher than the bottom end of the partition 26.

Namely, the central part of the camera body 10 and the shaft void are interconnected through a gap formed between the partitions 26 and 27 so that wires (or cables) electrically connecting a power circuit inside the camera body 10 and the flash body (not shown) can be strung through this gap. As shown in the figures, the wires 28 are laid along the path defined by the gap between the partitions 26 and 27 to form a shape similar to the letter "N". Further, the wires 28 are inserted inside the shaft member 17 from the bottom end of the shaft member 17 and connected to the flash body (not shown) by passing through the inside of the rotational joint 22, arm member 18, rotational joint 23 and flash support member 19. Note that the arrangement of the wires 28 is not restricted to the shape similar to the letter "N" as in the present embodiment. The wires 28 may also be laid along a shape similar to the letter "S", "U" or the like, unless the wires 28 can be flexibly warped during an axial motion of the shaft member 17.

As illustrated in FIG. 12, the wires 28 wired along a shape similar to the letter "N" warp closely along the bottom end of the partition 26 when the flash unit 15 is in the popped up position. On the other hand, when the flash unit 15 is in the retracted position, the shaft member 17 is depressed as shown in FIG. 11 and the wires 28 are laid on and warped along the bottom surface of the camera body 10 instead of along the bottom end of the partition 26.

Namely, the positions of the bottom end of the partition 26, the top end of the partition 27 and the length of the wires 28 from the top end of the partition 27 to the shaft member 17 may be determined in consideration of the position of the bottom end of the shaft member 17, its displacement and the like; for the wires 28 are neither to be stretched in the popped up position nor supplied with excessive slack in the retracted position.

Figure 13:
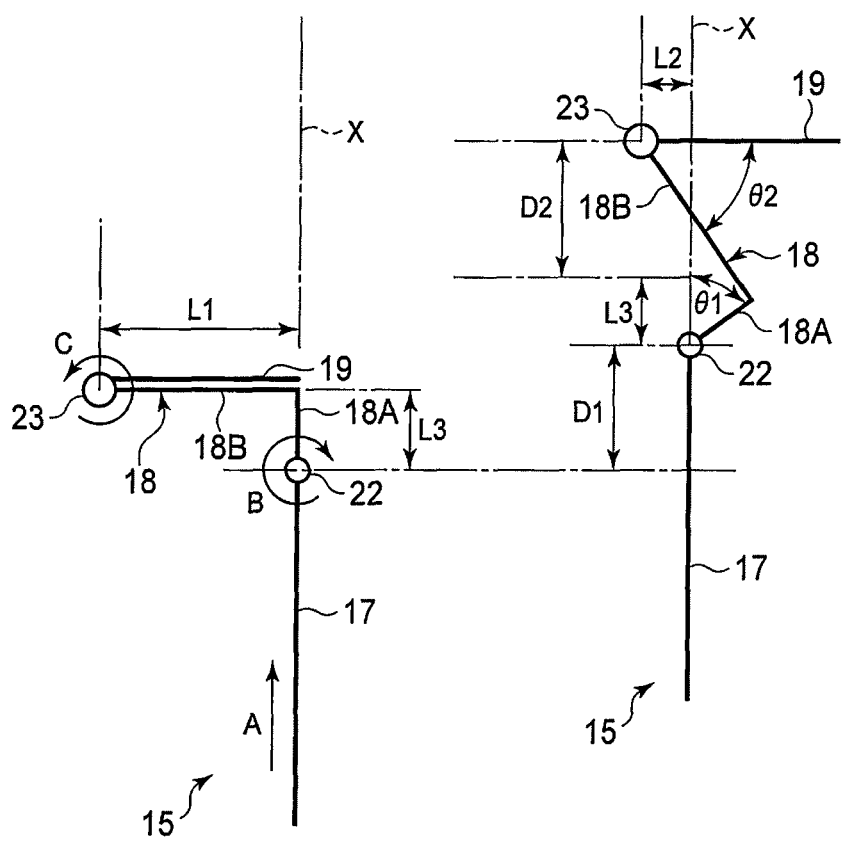
FIG. 13 is a schematic diagram to illustrate the mechanical structures of the built-in flash unit.

Referring to FIG. 13, the behavior and effects of the pop-up mechanism of the present embodiment will be explained. FIG. 13 schematically illustrates mechanical features of the built-in flash unit 15. The arrangement of the members of the built-in flash unit 15 when it is in the retracted position is illustrated on the left side of FIG. 13, and the arrangement in the popped up position is illustrated on the right side. Note that in FIG. 13, the lens is positioned on the left-hand side of the built-in flash unit 15.

In the present embodiment, the arm member 18 may have a shape corresponding to the letter "L". The end of the short arm segment 18A of the arm member 18 is connected to the top end of the shaft member 17 via the rotational joint 22. In the flash-retracted position, the short arm segment 18A is aligned in the axial direction of the shaft member 17 and received inside the shaft void. At the same time, the long arm segment 18B of the arm member 18 is oriented in the lateral direction toward the central area of the camera body 10 and parallel to the Y-axis (see FIGS. 1 and 2) of the camera body 10.

Further, in the flash-retracted position, the flash support member 19 is laterally positioned along the long arm segment 18B. Note that the long arm segment 18B of the arm member 18 in FIG. 13 is illustrated on the upper side of the flash support member 19 for the sake of convenience. In reality, the flash support member 19 is positioned in front of and adjacent to the long arm segment 18B.

Figure 5:
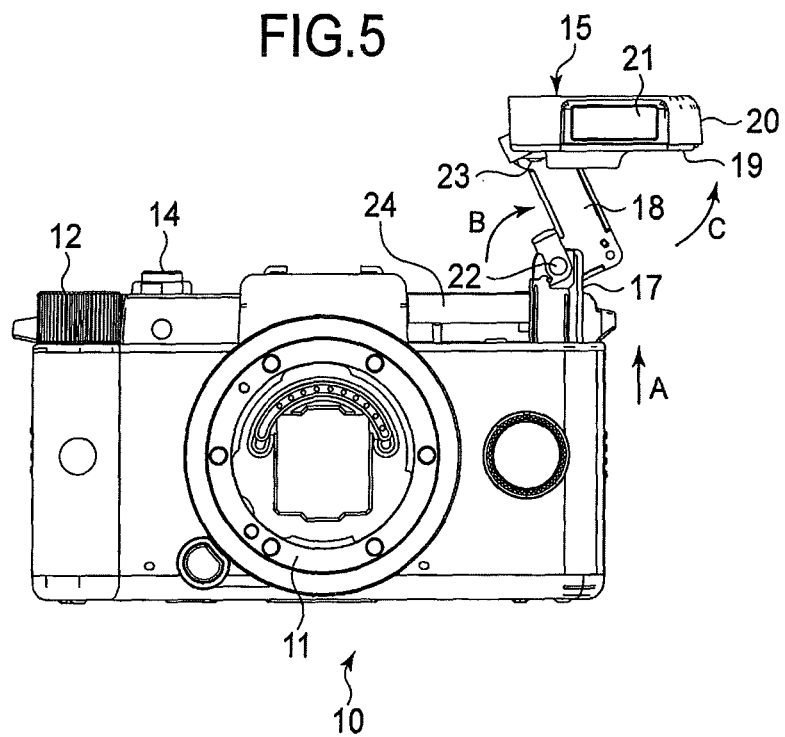
FIG. 5 is a front elevational view of the compact camera when a built-in flash is popped up.
Figure 6:
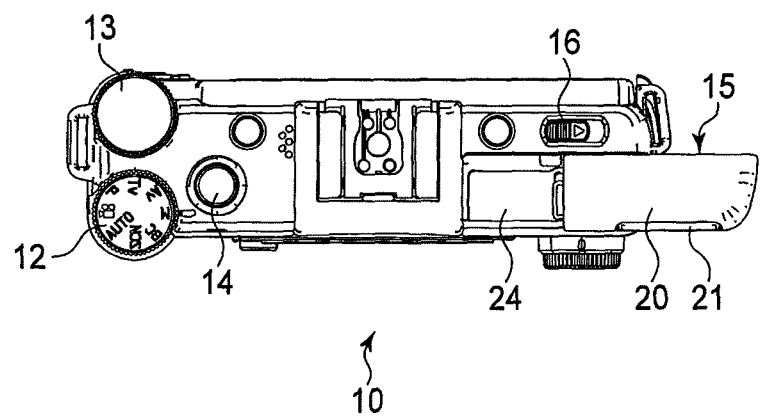
FIG. 6 is a top plan view of the compact camera when the built-in flash is popped up.
Figure 7:
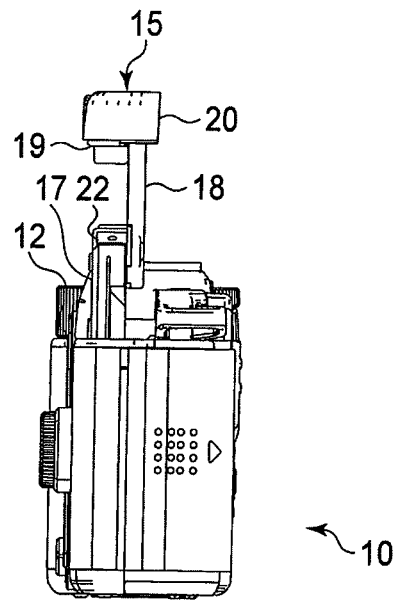
FIG. 7 is a right side elevational view of the compact camera when the built-in flash is popped up.

As explained with reference to FIG. 5, the shaft member 17 is biased upward (the direction "A") along the axis "X" (the first axis), and the arm member 18 is rotationally biased in the clockwise direction (the direction "B") via the rotational joint 22 about the second axis, which is perpendicular to the first axis "X". Further, the flash support member 19 is rotationally biased in the counter-clockwise direction (the direction "C") via the rotational joint 23 about the third axis that is perpendicular to the first axis "X". Incidentally, if the built-in flash mechanism is provided on the side opposite to the present embodiment (the left side in FIG. 1), the directions of the rotational biasing are opposite.

When the engagement for fixing the position of the pop-up mechanism is released by manipulating the pop-up knob 16 (see FIG. 4), the shaft member 17 is slid upward for a distance "D1", the arm member 18 is rotated outward with respect to the camera body 10 at an angle θ1, and the flash support member 19 is rotated at an angle θ2 with respect to the arm member 18. Note that in this pop-up or pop-out operation, the flash body is moved within a plane parallel to the imaging surface of the camera's imaging device and perpendicular to the optical axis "L", see FIGS. 1-3.

In the present embodiment, the angle θ1 is approximately equal to the angle θ2 so that the flash support member 19 is positioned in parallel with the lateral axis "Y" (see FIGS. 1 and 2) of the camera body 10 in the popped up position. However, the value of θ2 may be selected on the basis of placing the luminous body of the flash as far as possible from the optical axis "L" and at the same time allowing the built-in flash unit 15 to be retracted to the recessed flash seat 24 by only depressing the flash support member 19, so that the value of θ2 may not be approximately equal to θ1. For example, the angle θ2 may be selected within the range from θ1 to θ1+90°. However, when the lateral axis of the luminous body and the lateral axis "Y" of the camera body 10 (i.e., the horizontal line of the imaging device) are not substantially parallel, the vignetting effect may occur in one of four corners of the imaging area depending on an inclination angle of the luminous body. Therefore, the present embodiment, which set θ1=θ2, may be preferable. Note that the limitation of the rotation is performed by a stop mechanism (not shown) provided on the rotational joints 22 and 23.

The rotational angle θ1 is set so that the rotational joint 23 (the third axis) is positioned on the inner side (the left side in the figure) of the rotational joint 22 (the second axis) with respect to the axis (the first axis "X") of the shaft member 17. The position of the rotational joint 23, i.e., the flash body or luminous body, is moved upward at a distance "D2" along the vertical axis by θ1 rotation of the arm member 18 about the rotational joint 22 and also moved along the lateral axis (Y) at a distance (L1-L2) toward the outside.

Here, "L1" denotes the length of the long arm segment 18B of the L-shaped arm member 18 and it corresponds to the distance of the rotational joint 23 from the first axis "X" in the retracted position. Further, "L2" denotes the distance of the rotational joint 23 from the first axis "X" in the popped up position. In the present embodiment, which employs the L-shaped arm member 18, $L2=L1*\cos θ2-L3*\sin θ1$ and $D2=L1*\sin θ2+L3*(\cos θ1-1)$, where "L3" denotes the length of the short arm segment 18B of the arm member 18.

Therefore, according to the pop-up mechanism of the present embodiment, the flash body or luminous body is moved further away from the lens or the optical axis in addition to the sliding translation of the shaft member 17 along the first axis for the distance "D1". Namely, the flash body is displaced for the additional distance "D2" in the vertical direction and the additional distance (L1-L2) in the lateral direction by the rotational movement of the arm member 18. Thereby, the built-in flash can be further displaced away from the optical axis of the lens and a vignetting effect and red-eye effect can be effectively prevented.

Further, in order to retract the built-in flash in the popped up position, a user merely depresses the flash cover 20 (see FIGS. 5 and 8) toward the recessed flash seat 24. When the flash cover 20 is depressed, the arm member 18 is rotated in the counter-clockwise direction against the rotational biasing force of the rotational joint 22 and laid down to the left in FIG. 13 to be settled in the retracted position, which is illustrated on the left side of FIG. 13. This movement may be obtained by positioning the rotational joint 23 on the side closer to the center of the camera body 10 than the rotational joint 22, such as on the left side of the first axis "X" in FIG. 13.

Further, the pop-up mechanism of the present embodiment is configured so that when the built-in flash unit 15 is depressed by the user, the arm member 18 and the flash support member 19 are first folded to turn the long arm segment 18B of the arm member 18 sideways before the shaft member 17 is depressed. Thereby, the strength of the rotational biasing forces of the rotational joints 22 and 23 and the upward biasing force applied to the shaft member 17 are set accordingly for each of the members to move in the above-mentioned order. Namely, in the present embodiment, the strength of the upward biasing force of the shaft member 17 is set to be the strongest among them. Note that frictional resistance or other means may also control the above-mentioned order.

With reference to FIGS. 14-19, the inventive mechanism of the rotational joints 22 and 23 will be explained.

In the present embodiment, the pop-up mechanism is configured to rotatably connect three members together, the shaft member 17, arm member 18 and flash support member 19. The joints are also required to be made very small and narrow for the pop-up mechanism to be retracted inside the miniature sized camera body.

Figure 14:
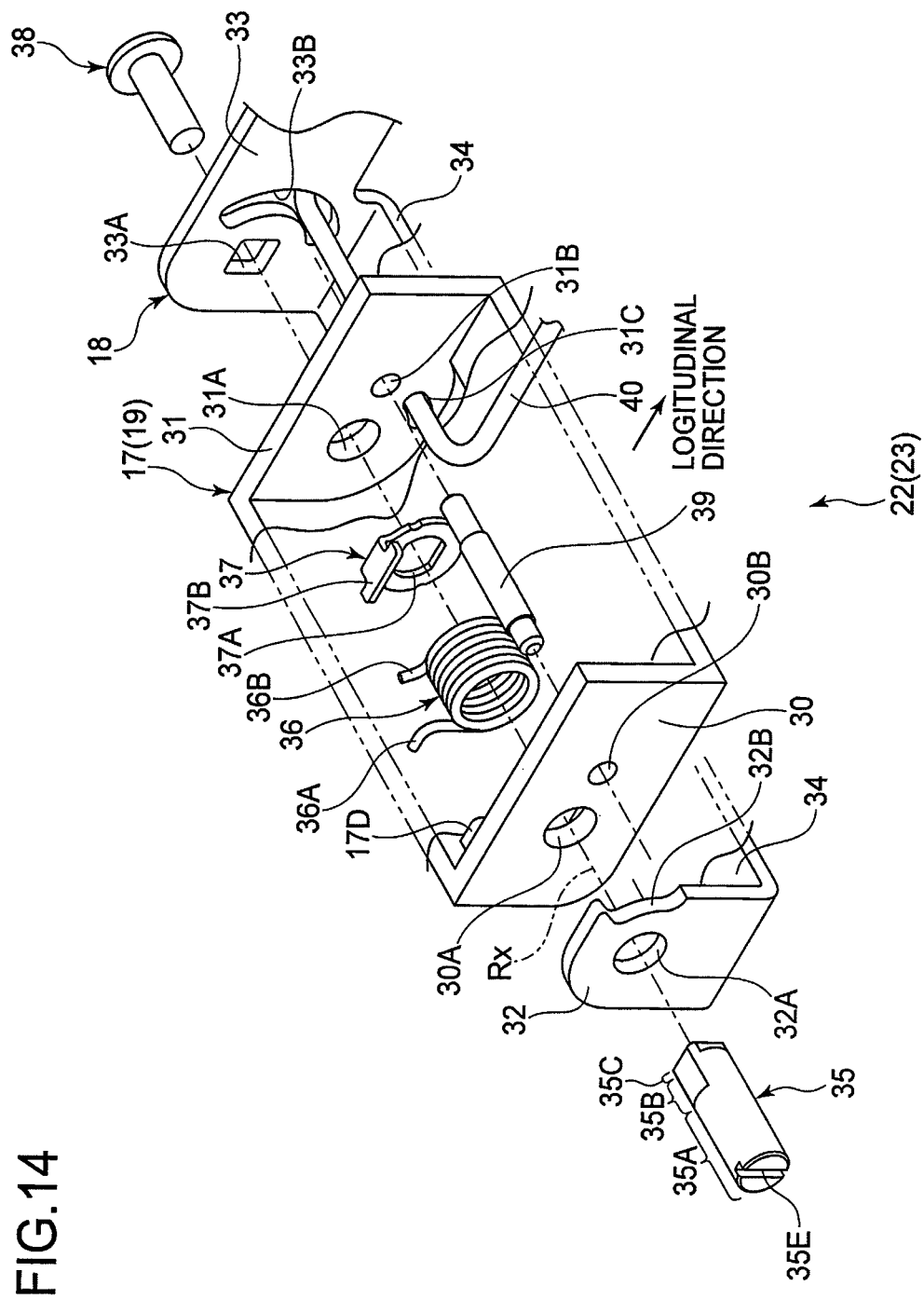
FIG. 14 is an exploded perspective view of a rotational joint of the present embodiment.

FIG. 14 is an exploded perspective view of the rotational joint (22 and 23), which schematically shows the mechanical structure of the rotational joint. In FIG. 14, a member that is disposed at the center corresponds to the shaft member 17 or the flash support member 19 (hereinafter referred to as a first member). Further, a member arranged on the both sides of the first member or into which the first member is interposed corresponds to the arm member 18 (hereinafter referred to as a second member). Note that in FIG. 14, the space between the first member 17 (19) and the second member 18 in the rotational axis direction is exaggerated to clearly show the arrangement of elements installed inside the rotational joints 22 and 23.

The first member 17 (19) may be formed as a thin rectangular casing elongated on one side. In FIG. 14, one side of the first member 17 (19) is opened to show inside the casing. However this opening is normally covered with a lid member when it is assembled so that the casing is enclosed. The rotational axis Rx (first or second axis) may be arranged perpendicular to a pair of sidewalls 30, 31 that face each other, such as the back-facing surface and front-facing of the shaft member 17.

The second member 18 has plate members 32 and 33 that are arranged parallel with each other and are disposed adjacent or in contact with the outer sides of the sidewalls 30 and 31 of the first member. The plate member 32 and 33 may be connected via a connecting plate member 34. Note that as for the arm member 18 of the present embodiment, either side of the L-shaped plate that configures the front face of the arm member 18, which is illustrated in FIGS. 8 and 12, may correspond to the plate member 33 and the connecting plate member 34 that extends perpendicularly from the plate member 33 for a length approximate to the width of the first member 17 (19). Further, the plate member 32 extends perpendicularly from the edge of the connecting plate member 34 (the edge on the side opposite to the plate member 33) and faces the plate member 33 so that the plate members 32 and 33 are arranged perpendicular to the rotational axis Rx.

The rotational shaft member 35 is employed to provide the rotational axis Rx. Holes (rotational shaft mounting holes) 30A, 31A, 32A and 33A, into which the rotational shaft member 35 is inserted, are bored through the sidewalls 30 and 31 of the first member and the plate members 32 and 33 of the second member, respectively. Further, a torsional spring 36 and a stop ring 37 that cooperate with the rotational shaft member 35 are installed inside the first member 17 (19). During assembly, the rotational shaft member 35 is pushed into the first member 17 (19) through the holes 32A and 30A so that the torsional spring 36 and the stop ring 37 can be attached. The rotational shaft member 35 is then inserted through the holes 31A and 33A until its end reaches the outer facing surface of the plate member 33. Inside the tip end of the rotational shaft member 35, a screw hole 35D is threaded along the shaft axis. A screw 38 is screwed into the screw hole 35D and the head of the screw 38 abuts against the plate member 33. Thereby, the plate member 33, i.e., the second member 18, is fixed to the rotational shaft member 35. Note that instead of the screw 38, a pin that is press-fitted into the hole 35D may be used.

Figure 15:
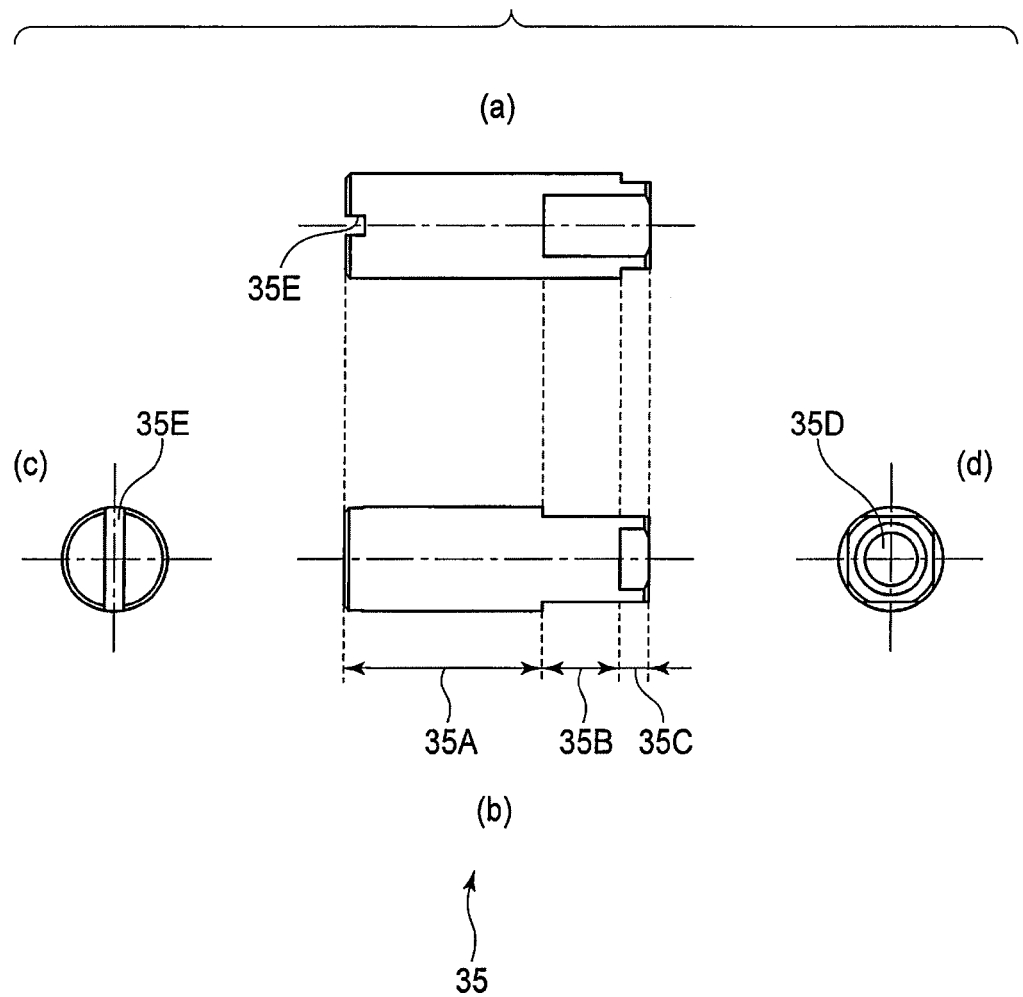
FIG. 15 includes a plan view, front view, right side view and left side view of a rotational shaft member.

The detail of the rotational shaft member is depicted in FIG. 15. Each of (a)-(d) in FIG. 15 corresponds to a plan view, front view, left side view and right side view of the rotational shaft member 35. The rotational shaft member 35 is formed to have a cylindrical portion (shaft body) 35A, a stop-ring securing portion 35B with two parallel D-cuts machined into the cylinder (first D-cut flattening) and a second-member securing portion 35C with two further D-cut flats machined into the cylinder (second D-cut flattening) that are perpendicular to the D-cut flats of the stop-ring securing portion 35B. Incidentally, the screw hole 35D is formed on the end face of the second-member securing portion 35C.

As described latter, the D-cut flats machined into two sides of the stop-ring securing portion 35B are formed to attach the stop ring 37 securely to the rotational shaft member 35. Further, the D-cut flats machined on four sides of the second-member securing portion 35B are formed so that the rotational shaft member 35 fits securely into the hole 33A. Incidentally, in the present embodiment, rattle between the stop ring 37 and the stop-ring securing portion 35B that may be caused by errors in machining is prevented by providing two D-cut flats in the stop-ring securing portion 35B. Further, rotational power is transmitted between the rotational shaft member 35 and the second member 18 via the four D-cut flats provided in the second-member securing portion 35C so that force is evenly distributed on each flat, thus improving the strength of the engagement.

In the present embodiment, two and four D-cut flats are provided on the stop-ring securing portion 35B and the second-member securing portion 35C, respectively; however, the number of D-cut flats is not restricted to these amounts. For example, the stop-ring securing portion 35B may only have one flat and the second-member securing portion 35C may only have two flats.

The rotational shaft member 35 is inserted into the holes 32A, 30A, 31A and 33A, in this order, with the second-member securing portion 35C as the leading edge. The inner diameter of the holes 32A and 30A have the same dimension as the outer diameter of the cylindrical portion 35A except for the tolerance, and the end of the cylindrical portion 35A fits into the holes 32A and 30A. Further, the torsional spring 36 is disposed around the cylindrical portion (shaft body) 35A, which is arranged inside the first member 17 (19).

The stop ring 37 may be a metal plate substantially formed as a circular shape with a hole 37A provided at the center. The hole 37A is formed complementary to the D-cut section of the stop-ring securing portion 35B. Further, the stop ring 37 may have a T-shaped peg radially extending from its outer periphery to hook onto the spring end. The end of the peg, which corresponds to the head of the letter "T", may be bent substantially perpendicular to the plate. Note that this bent portion of the peg is configured to form a stop 37B that can engage with an end of the torsional spring 36, as discussed later. The stop ring 37 is fitted to the stop-ring securing portion 35B so that its axial motion is restricted by steps formed between the cylindrical portion 35A and the stop-ring securing portion 35B. Further, the rotational motion of the stop ring 37 is restricted by engagement between the D-cut flats and the hole 37A so that the stop ring 37 is held in place and unable to rotate with respect to the rotational shaft member 35.

The hole 31A, which is bored into the sidewall 31 of the first member 17 (19), is formed as a circular hole having the same diameter as the holes 30A and 32A. When the rotational joint is assembled, one end of the stop-ring securing portion 35B is positioned in the hole 31A so that the second-member securing portion 35C extends beyond the sidewall 31. The hole 33A, which is bored in the plate member 33, is configured so that the second-member securing portion 35C fits inside of it. In this embodiment the hole 33A has a rectangular shape. When the second-member securing portion 35C is fitted into the hole 33A, the rotational motion of the plate member 33 and, in turn, the second-member 18 are restricted to the rotational movement of the rotational shaft member 35 so that the plate member 33, second-member 18 and the shaft member 35 are integrated with respect to rotational motion.

Further, when the screw 38 is tightly screwed into the rotational shaft member 35, the plate member 33 is held between the head of the screw 35 and the steps formed between the stop-ring securing portion 35B and the second-member securing portion 35C. Namely, the rotational shaft member 35 is fixed to the second member 18 so that the motion of the rotational shaft member 35 is restricted in both the axial and rotational directions with respect to the second member 18.

On the other hand, the first member 17 (19) is rotatable with respect to the rotational shaft member 35 via the holes 30A and 31A, and its rotation is supported by contact between the two remaining arcuate or cylindrical surfaces of the stop-ring securing portion 35B and the similar arcuate or circular dimensions of the inner periphery of the hole 31A. Further, one end 36A of the torsional spring 36 is engaged with a stop member 17D that is integrally provided on an inside surface of the first member 17 (19) and the other end 36B is engaged with the stop member 37B that is provided on the stop ring 37.

Namely, the first member 17 (19) is rotatably supported by the rotational shaft member 35 that is fixed to the second member 18 so that its axial motion is restricted by the plate members 32 and 33 of the second member 18. Therefore, the space between the plate members 32 and 33 is designed to be narrow enough so that each plate member 32 and 33 makes contact with the outer surfaces of the respective sidewalls 30 and 31, disregarding tolerances. Further, a biasing force is provided between the first member 17 (19) and the second member 18 by the torsional spring 36 in which the one end is engaged with the first member 17 (19) and the other end is engaged with the stop ring 37, which is fixed to the rotational shaft member 35.

Further, the rotational joint 22 (23) of the present embodiment is provided with a pin member 39 for limiting the rotational range of movement between the first member 17 (19) and the second member 18. The pin member 39 may include a metal for high intensity and shock resistance. The pin member 39 is press-fitted into pin-mount holes 30B and 31B that are bored in the sidewalls 30 and 31, respectively. One end of the pin member 39 protrudes outwardly from the sidewall 30 and is located in an arcuate cutout (or notch, groove, etc.) 32B provided on one edge of the plate member 32. The range of the rotational motion is limited by the arcuate cutout 32B, due to the engagement between the pin member 39 and the plate member 32 at either end of the cutout 32B. As an example, the central angle of the arcuate cutout 32B may be 60 degrees.

Note that a minute adjustment of the rotational range may be controlled by adjusting the thickness of the pin member 39, which engages with both sides of the cutout 32B. For example, as shown in FIG. 14, the diameter of an end portion of the pin member 32B may be machined to be thinner than the main portion. Further, in the example of FIG. 14, both ends of pin member 39 protrude out from the sidewalls 30 and 31 of the first member 17 (19), and the end portion protruding from the side opposite to the cutout 32B (plate member 33) is also machined thinner than the main body of the pin member 39. This configuration may be adopted to improve stability when the rotational limit is reached by using both ends of the pin member 39 to stop the rotational movement so that the other end of the pin member is also engaged with an end of an arcuate notch 33B that is bored in the plate member 33 of the second member 18. Note that the arcuate notch 33B is also provided for routing wiring within the rotational joint 22 (23). The diameter of the other end of the pin member 39 is adjusted to match a limiting position on the plate member 33 side with the position defined by the cutout 32B on the plate member 32 side. Note that the range of the rotational motion can also be limited by the cutout 32B alone. In such case, only the tip end of the pin member 39 on the plate member 32 side may protrude out while the diameter of the end portion on the other side is left as the same size as the main body of the pin member 39.

As described above, when the rotational joint 22 (23) of the present embodiment is assembled, the wiring (or cable) 40 is routed either from the first member 17 (19) to the second member 18 or from the second member 18 to the first member 17 (19). Therefore, an arcuate or circular wiring hole 31C that is formed to guide the wire 40 is bored in the sidewall 31, and on the plate member 33 is bored the arcuate notch 33B that corresponds to the locus of the wiring hole 31C. Namely, when the rotational joint 22 (23) is rotated, the wiring hole 31C moves along the arcuate notch 33B. The wire 40 is routed through the wiring hole 31C and the arcuate notch 33B so that wiring extends from inside of the first member 17 (19) to the second member 18. Since the wire 40 can move in the arcuate notch 33B, the wire 40 in the rotational joint 22 (23) is not exposed to excessive force even when the first member 17 (19) is rotated against the second member 18.

Note that the shape of the wiring hole 31C may be selected according to the number and the arrangement of the wires to be employed. For example, when a plurality of wires is routed through the hole in a parallel arrangement, an arcuate notch with length corresponding to the umber of the aligned wires is preferable. When only a single wire is used or when wires are bundled to have a circular section, the shape of the wiring hole 31C may be a circle.

Figure 16:
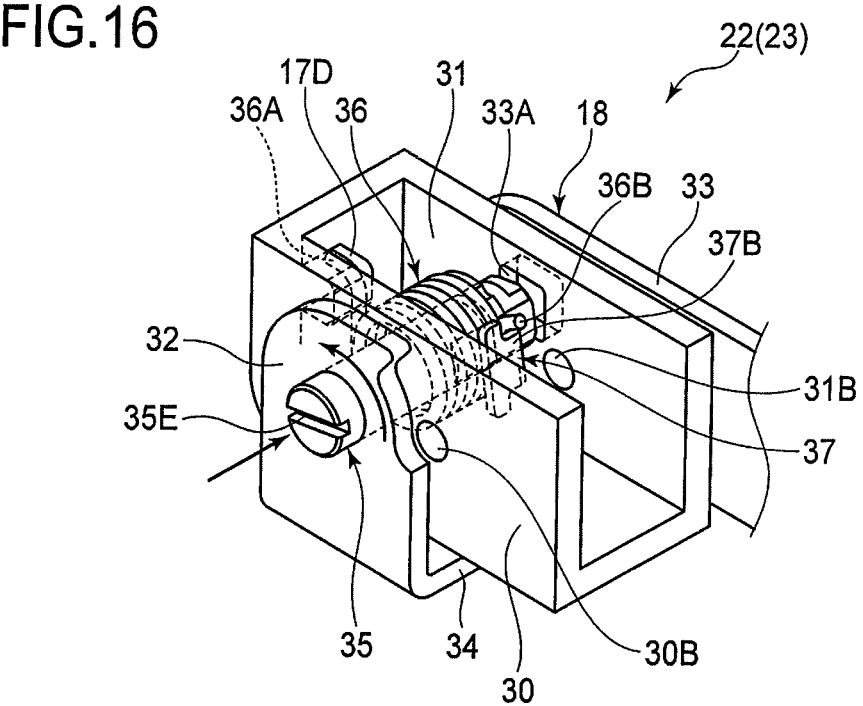
FIG. 16 is a perspective view of the rotational joint that is partially assembled.
Figure 17:
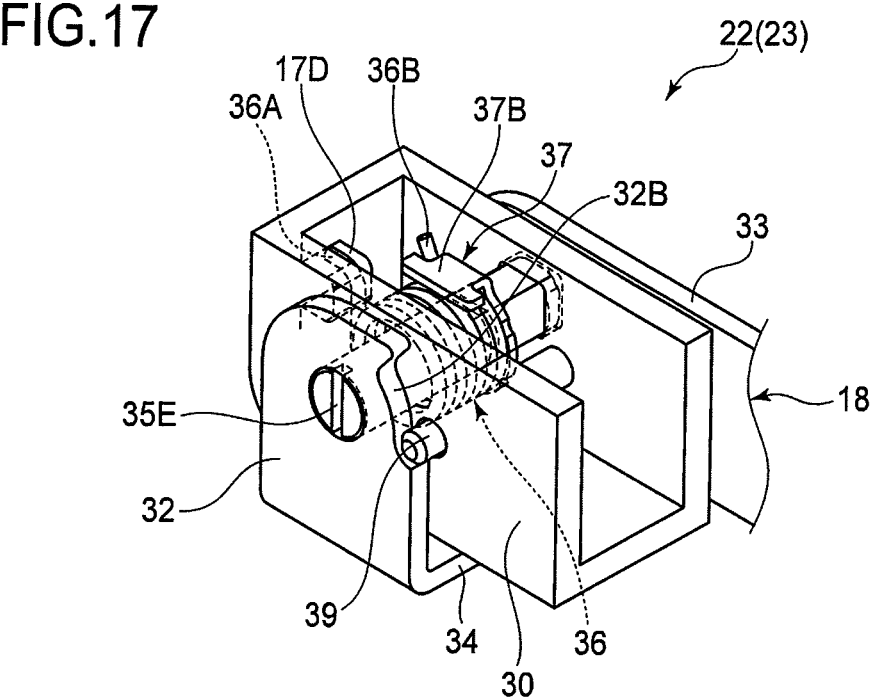
FIG. 17 is a perspective view of the rotational joint when the assembly is finished.

With reference to FIGS. 16 and 17, an assembly process for the rotational joint is explained. FIG. 16 is a perspective view of the rotational joint 22 (23) partially assembled with the interior elements visualized by broken lines, whereas FIG. 17 is a perspective view of the same when the assembly is finished.

As mentioned above, the rotational shaft member 35 is inserted from the plate member 32 toward the plate member 33 and then the torsional spring 36 and the stop ring 37 are attached to the rotational shaft member 35 inside the first member 17 (19). At this point, the second-member securing portion 35C, which is the tip end of the rotational shaft member 35, is not yet inserted into the hole 33A of the plate member 33, but may be positioned in the hole 31A of the sidewall 31. Further, at this point, substantial torsion is still not applied to the torsional spring 36; however, one end 36A of the torsional spring 36 is engaged with the stop member 17D of the first member 17 (19) and the other end 36B of the torsional spring 36 is engaged with the stop member 37B of the stop ring 37.

For example, a screwdriver is locked into a screw drive (e.g., a slot) 35E of the rotational shaft member 35 to rotate the rotational shaft member 35 in a direction biasing the torsional spring 36, as illustrated in FIG. 17. When it reaches the position where the end face profile of the second-member securing portion 35C is aligned with the hole 33A of the plate member 33, the second-member securing portion 35C is fitted into the hole 33A so that the rotational shaft member 35 is secured to the second member 18 by the screw 38. Accordingly, the assembly of the rotational joint 22 (23) is complete and the wiring 40 is wired. Incidentally, it may be preferable to position the end face on the cylindrical portion 35A side of the rotational shaft member 35 either flush with the outer surface of the plate member 32 or slightly countersunk inside the hole 32A.

Figure 18:
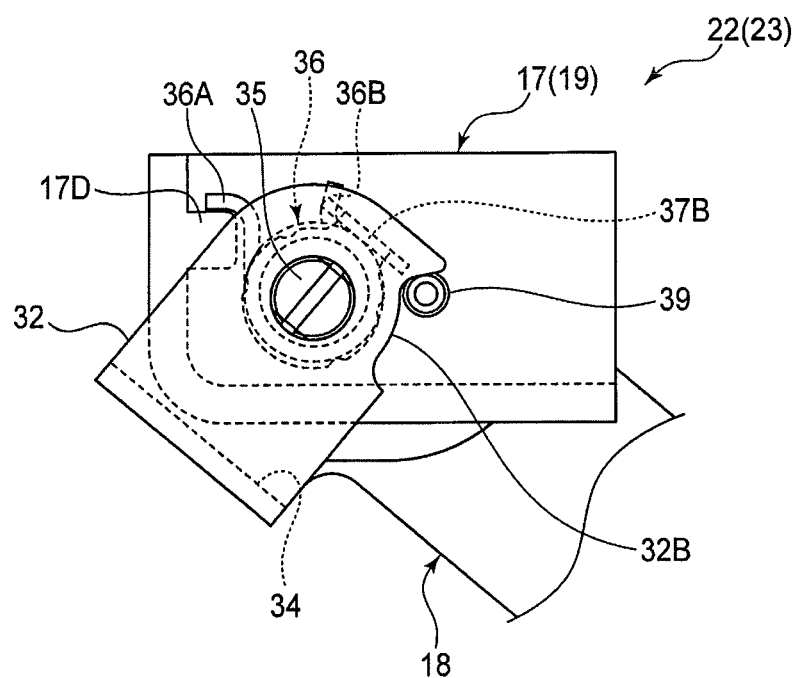
FIG. 18 is an elevational view of the rotational joint from one side.
Figure 19:
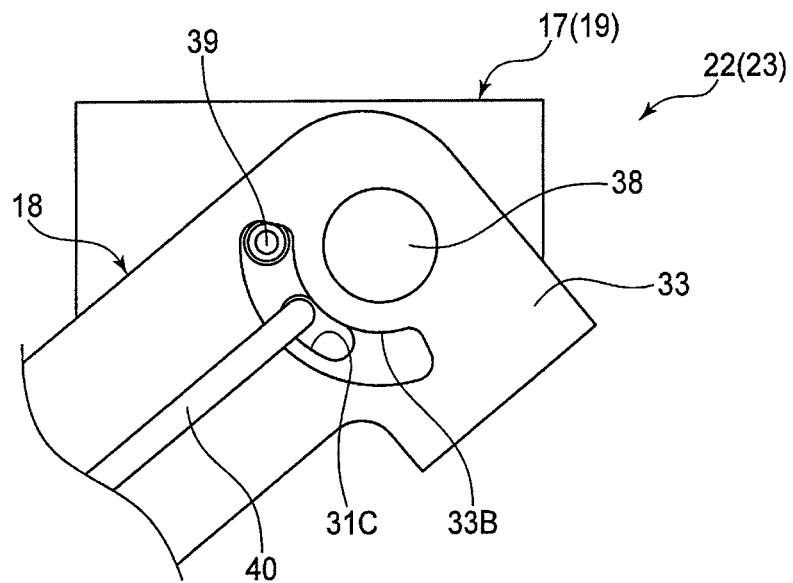
FIG. 19 is an elevational view of the rotational joint from the other side.

FIGS. 18 and 19 illustrate the position of the rotational joint 22 (23) when the first member 17 (19) is rotated against the second member 18 from the position illustrated in FIG. 17 by the biasing force of the torsional spring 36. Note that FIGS. 18 and 19 are elevational views from the plate member 32 side and the plate member 33 side, respectively. The broken lines in FIG. 18 indicate the structures inside the rotational joint 22 (23).

In FIGS. 18 and 19, the position when the pin member 39 for limiting the range of the rotational motion of the rotational joint 22 (23) is positioned at one end of the arcuate cutout 32B on the edge of the plate member 32 is illustrated. Namely, the figures show the maximum rotational position when the rotational joint 22 (23) is rotated in the biasing direction.

In FIG. 19 the pin-mount hole 31B (in which the pin member 39 is fitted) is positioned at the one end of the arcuate notch 33B bored in the plate member 33 so that the tip end of the pin member 39 on the plate member 33 side limits the rotational movement of the rotational joint 22 (23) in one rotational direction. Further, the wire 40 passing through the wiring hole 31C is routed to the outside of the plate member 33 through the arcuate notch 33B.

Note that the central angle of the arcuate notch 33B is greater than that of the arcuate cutout 32B, making it greater than the rotational angle available for the rotational joint 22 (23). Thereby, even when the second member 18 is rotated to the position illustrated in FIG. 17, against the biasing force of the torsional spring 36, the wiring hole 31C cannot be covered or closed off by the plate member 33 defining the other end of the arcuate notch 33B.

As described above, according to the present embodiment, the biasing member employed in the rotational joint mechanism, which rotatably connects the first and second members, can be miniaturized. Particularly, the mechanical structure around the rotational shaft member is simplified and miniaturized while the assembly process is also simplified by providing the rotational shaft member with different sections having a different number of D-cut flats, accepting the lock ring inside the first member, and then fitting and securing the second member to the rotational shaft member. Further, the rotational movement is stabilized and at the same time the axial positions of the first and second members are restricted in view of the fact that the first member is disposed between the plate members of the second member and both ends of the rotational shaft member are supported by the plate members.

Further, in the present embodiment, wiring is fed through the rotational joint in a simple configuration by providing the wiring hole in the sidewall of the first member and providing the arcuate notch in the plate member of the second member at a position corresponding to the wiring hole, and with the center of angle of the arc greater than the rotational range of the rotational joint. Further, the pin member limiting the rotational range of the joint can easily be removed from the rotational joint because the pin-mount hole, after assembly, is positioned so that it faces the arcuate notch. Moreover, by controlling the diameter of the tip end of the pin member, the stop positions (stop angles) in the rotation can be adjusted, thus design variation is increased.

Further, by applying the above-described rotational joints to the pop-up mechanism of the present embodiment, while maintaining a compact retracted size the flash body in the popped up position can be moved further away from the retracted position than what the pop-up mechanism of prior art was capable of by using only one of a rotational or translational movement. Thereby, a vignetting effect and red-eye effect can be effectively prevented. In particular, the pop-up mechanism of the present embodiment is useful for a compact interchangeable-lens camera of which space is limited and to which a lens with a short focal length may be mounted.

Further, the pop-up mechanism of the present embodiment moves the flash body in a plane parallel to the imaging surface of the imaging device so that the light source can be efficiently moved away from the optical axis of the lens. Further, since the arm member is positioned on the rear side of the flash support member and the shaft member, in other words behind the flashed-light emitting surface, the dimension of the built-in flash unit in the front-to-back direction is reduced. Moreover, when the arm member and the flash support member are folded, the retracted size of the unit is further reduced by laying the arm member side-by-side adjacently behind the flash support member.

In the present embodiment, the built-in flash unit can easily be moved to the retracted position by a user merely depressing the built-in flash unit. This is due to the arrangement of the rotational joints on both ends of the arm member in the popped up position, namely, the upper rotational joint being positioned relatively closer to the central side than the lower rotational joint. Further, the built-in flash is retracted more smoothly since the pop-up mechanism is configured to have the flash support member and the arm member folded first before the shaft member is depressed.

Although the shaft member of the present embodiment is slid or extended upward, the shaft member may also be extended in any direction if it can be generally regarded as included in a plane perpendicular to the optical axis. Further, as an example, the present embodiment is explained for a compact interchangeable-lens camera; however, the pop-up mechanism of the present embodiment can also be applied to any type of camera. In the present embodiment, the arm member has a shape of the letter "L", as an example; however, the arm member can also have a shape similar to the letters "I", "Z" and so on.

Incidentally, the built-in flash may be configured to flash in either the retracted position or the popped up position. Further, the order of movements of the members in the pop-up motion is not restricted to the present embodiment and it may be adjusted by controlling a biasing force or providing frictional resistance.

In the present embodiment, the rotational biasing forces for each of the rotational joints (about the second and third axes) are opposite to one another. However, these rotational directions may also be the same. Further, the position of the flash in the popped up position can be made more distant from the retracted position by employing more arm members or linking components. For example, arm members having an "L" shape and a reversed "L" shape may be alternately linked together to configure the pop-up mechanism. However, from the aspect of reducing the size, the number of arm members may be one, as in the present embodiment.

Note that in the present embodiment, the end face of the cylindrical portion of the rotational shaft member is slotted, however, it may include a phillips head, square socket, hexagonal socket or any type, as long as it can rotate the rotational shaft member providing resistance against the biasing force of the torsional spring.

Although the pop-up mechanism employing the rotational joints of the present embodiment is applied to pop out a flash, this mechanism can also be applied to pop out a variety of devices including an IR remote receiver, a light source for an AF operation, and a microphone. For example, the pop-up or pop-out mechanism is useful for the above devices when IR communication, an AF operation or sound capture is impaired by an obstacle such as a camera lens hood and the like.

Further, the rotational joint of the present embodiment may also be used in a device other than a camera. For example, the present rotational joint may be applied to various miniature devices including a cellular phone and the like, such as for a joint connecting an antenna or hinges used in a miniature electronic device, e.g., a folding cellular phone.

In the present embodiment, a torsional spring is employed to provide a biasing force to the rotational joint. However, the torsional spring may be altered by another biasing member known in the art. For example, one end of a rubber element may be connected to the first member and the other end to the second member while winding the rubber element about the rotational shaft member to provide the rotational biasing force.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2011-137733 (filed on Jun. 21, 2011), which is expressly incorporated herein, by reference, in its entirety.

The invention claimed is:

1. A rotational joint, comprising:
a first member having a pair of sidewalls that face each other;
a second member having a pair of plate members each disposed proximate to outside faces of the pair of sidewalls;
a rotational shaft member extending into shaft holes provided in each of the plate members and the sidewalls;
a rotational biasing member that is disposed around the rotational shaft member, one end of the rotational biasing member being engaged with a stop member that is provided on an interior wall of one of the pair of sidewalls of the first member;
a stop ring, the other end of the rotational biasing member is engaged with the stop ring, the stop ring being fixed to the rotational shaft member; and
the first member being rotatable with respect to the rotational shaft member, the rotational shaft member being fixed to the second member, the rotational biasing member providing a rotational biasing force about the rotational shaft member between the first and second members, and the rotational biasing member and the stop ring being disposed between the sidewalls;
wherein a wiring hole is provided in one of the sidewalls of the first member and an arcuate notch that corresponds to a locus of the wiring hole when the joint is rotated is provided in the plate member of the second member that faces the wiring hole, and a wire in the first member extends through the wiring hole and the arcuate notch to the second member.

2. The rotational joint as in claim 1, wherein the rotational shaft member comprises:
a cylindrical portion;
a stop-ring fixing portion comprising a first D-cut flat provided on a cylindrical surface of the rotational shaft member;
a second-member fixing portion comprising the first D-cut flat and a second D-cut flat are provided on the cylindrical surface; and
the stop ring being provided with a hole having a shape complementary to a shape of the stop-ring fixing portion, and one of the plate members of the second member being provided with a shaft-mount hole having a shape complementary to a shape of the second-member fixing portion.

3. The rotational joint as in claim 2, wherein a sectional shape of the second-member fixing portion comprises a rectangular shape.

4. The rotational joint according to claim 1, the rotational biasing member being positioned around the rotational shaft and between the pair of sidewalls of the first member.

5. A rotational joint, comprising:
a first member having a pair of sidewalls that face each other;
a second member having a pair of plate members each disposed proximate to outside faces of the pair of sidewalls;
a rotational shaft member extending into shaft holes provided in each of the plate members and the sidewalls;
a rotational biasing member that is disposed around the rotational shaft member, one end of the rotational biasing member is engaged with a stop member that is provided on an interior wall of one of the pair of sidewalls of the first member;
a stop ring, the other end of the rotational biasing member is engaged with the stop ring, the stop ring being fixed to the rotational shaft member;
the first member being rotatable with respect to the rotational shaft member, the rotational shaft member being fixed to the second member, the rotational biasing member providing a rotational biasing force about the rotational shaft member between the first and second members, and the rotational biasing member and the stop ring being disposed between the sidewalls, and
a pin member that limits a range of relative rotation between the first and second members by engaging with one of the plate members of the second member, the pin member being fitted into pin-mount holes provided on each of the sidewalls of the first member, one end of the pin member protruding outwardly from at least one of the sidewalls to engage with one of the plate members.

6. The rotational joint as in claim 5, wherein a wiring hole is provided in one of the sidewalls of the first member and an arcuate notch that corresponds to a locus of the wiring hole when the joint is rotated is provided in the plate member of the second member that faces the wiring hole, a wire in the first member extends through the wiring hole and the arcuate notch to the second member.

7. The rotational joint as in claim 6, wherein a screw drive is provided on an end face of a cylindrical portion of the rotational shaft member.

8. The rotational joint as in claim 7, wherein an axial hole is provided in an end face of a second-member fixing portion of the rotational shaft member in which either a screw or a pin with a head is fitted.

9. The rotational joint as in claim 7, wherein one of the pin-mount holes faces the arcuate notch and the central angle of the arcuate notch is greater than the rotational range between the first and second members.

10. The rotational joint as in claim 6, wherein one end of the arcuate notch engages with the pin member to define the rotational range.

11. A rotational joint, comprising:
a first member having a pair of sidewalls that face each other;
a second member having a pair of plate members each disposed proximate to outside faces of the pair of sidewalls;
a rotational shaft member having a noncylindrical shape, the rotational shaft member extending into shaft holes provided in each of the plate members and the sidewalls;
a rotational biasing member that is disposed inside the first member and provides a rotational biasing force about the rotational shaft member, one end of the rotational biasing member being engaged with a stop member that is provided on an interior wall of one of the pair of sidewalls of the first member;
a stop ring that is engaged with the rotational biasing member and aligned with the rotational shaft member, the other end of the rotational biasing member is engaged with the stop ring, the stop ring being fixed to the rotational shaft member; and
a pin member that limits a range of relative rotation between the first and second members by engaging with one of the plate members of the second member, the pin member being fitted into pin-mount holes provided on each of the sidewalls of the first member, one end of the pin member protruding outwardly from at least one of the sidewalls to engage with one of the plate members.

12. The rotational joint as in claim 11, wherein the rotational shaft member comprises:
a cylindrical portion;
a stop-ring fixing portion that is partially cylindrical with at least one section of its lengthwise surface having a cross section with a first D-cut flat shape;
a second-member fixing portion that is partially cylindrical with a plurality of sections of its lengthwise surface having a cross section with the first D-cut flat shape and a second D-cut flat provided in the cylindrical surface; and
the stop ring being provided with a hole having a shape complementary to shape of the stop-ring fixing portion, and one of the plate members of the second member being provided with a shaft-mount hole having a shape complementary to the shape of the second-member fixing portion.

13. The rotational joint as in claim 12, wherein a wiring hole is provided in one of the sidewalls of the first member and an arcuate notch that corresponds to a locus of the wiring hole when the joint is rotated is provided in the plate member of the second member that faces the wiring hole, a wire in the first member extends through the wiring hole and the arcuate notch to the second member.

14. The rotational joint as in claim 13, wherein one of the pin-mount holes faces the arcuate notch and the central angle of the arcuate notch is greater than the rotational range between the first and second members.

15. The rotational joint as in claim 13, wherein one end of the arcuate notch engages with the pin member to define the rotational range.

16. The rotational joint as in claim 12, wherein a screw drive is provided on an end face of the cylindrical portion of the rotational shaft member.

17. The rotational joint as in claim 16, wherein an axial hole is provided in an end face of the second-member fixing portion of the rotational shaft member in which either a screw or a pin with a head is fitted.

18. The rotational joint as in claim 12, wherein a sectional shape of the second-member fixing portion comprises a rectangular shape.

19. The rotational joint according to claim 11, the rotational biasing member being positioned between the pair of sidewalls of the first member.

* * * * *